United States Patent
Szabo

(10) Patent No.: US 6,557,217 B2
(45) Date of Patent: May 6, 2003

(54) CABLE CINCTURE FASTENING DEVICE

(76) Inventor: Steve I. Szabo, Box 784, Nakusp, British Columbia (CA), V0G 1R0

( * ) Notice: Subject to any disclaimer, the term of this patent is extended or adjusted under 35 U.S.C. 154(b) by 0 days.

(21) Appl. No.: 09/960,961

(22) Filed: Sep. 25, 2001

(65) Prior Publication Data

US 2002/0035766 A1 Mar. 28, 2002

Related U.S. Application Data

(60) Provisional application No. 60/234,993, filed on Sep. 25, 2000.

(51) Int. Cl.⁷ .......................... A44B 21/00; B63B 21/04; F16G 11/00
(52) U.S. Cl. .................. 24/129 R; 24/129 B; 24/122.6; 24/115 H; 114/218
(58) Field of Search ........................... 24/129 R, 129 B, 24/122.6, 115 H; 70/18; 114/218; 292/307 B, 327

(56) References Cited

U.S. PATENT DOCUMENTS

| | | | | |
|---|---|---|---|---|
| ,353,456 | A | * 11/1886 | Leyden | ............ 70/18 |
| ,959,076 | A | * 5/1910 | Scanlon | ............ 24/129 R |
| 1,128,305 | A | * 2/1915 | Gammache | ............ 24/115 H |
| 1,167,610 | A | * 1/1916 | Adams | ............ 24/129 R |
| 1,660,829 | A | * 2/1928 | Burd | ............ 24/129 R |
| 2,440,012 | A | 4/1948 | Haver | |
| 2,623,378 | A | 12/1952 | Haver | |
| 3,462,802 | A | 8/1969 | Merser | |
| 3,556,575 | A | 1/1971 | Farkas | |
| 4,057,983 | A | 11/1977 | Morgan | |
| 4,750,241 | A | 6/1988 | Powell | |
| 5,014,459 | A | * 5/1991 | Sublet | ............ 24/129 R |
| 5,181,402 | A | 1/1993 | Faessler et al. | |
| 5,193,252 | A | * 3/1993 | Svehaug | ............ 24/115 G |
| 5,352,003 | A | 10/1994 | Bystry | |
| 5,481,888 | A | 1/1996 | Perry | |
| 5,568,740 | A | 10/1996 | Lin | |
| 5,647,620 | A | 7/1997 | Kuenzel | |
| 5,743,574 | A | 4/1998 | Kohn | |
| 5,774,945 | A | 7/1998 | Ginocchio | |
| 5,901,416 | A | 5/1999 | Mears | |
| 6,109,074 | A | 8/2000 | Du | |
| 6,260,498 | B1 | * 7/2001 | Cochran | ............ 114/218 |
| 6,269,523 | B1 | * 8/2001 | Benoit | ............ 24/129 R |

FOREIGN PATENT DOCUMENTS

| | | |
|---|---|---|
| CA | 771853 | 11/1967 |
| CA | 1058838 | 7/1979 |
| CA | 1073642 | 3/1980 |
| CA | 1086027 | 9/1980 |
| CA | 1264011 | 12/1989 |
| CA | 2024882 | 3/1992 |
| CA | 1314387 | 3/1993 |

* cited by examiner

Primary Examiner—Victor Sakran
(74) Attorney, Agent, or Firm—Antony C. Edwards

(57) ABSTRACT

The cable fastening device of the present invention is for use in cooperation with a cable having a first lug mounted on a first end and a second lug mounted towards an opposite second end. The fastening device is for releasably fastening the first and second ends of the cable together with the cable snugly around a bundle of elongate objects such as logs. The fastening device includes a rigid housing having an elongate channel therein. The channel extends from a first end wall of the housing to a second and opposite end wall of the housing. A pair of side walls extends along the channel so as to define a channel opening and a channel cavity between the pair of side walls and the first and second end walls. A first cantilevered member extends into the cavity from a first side wall of the pair of side walls. A second cantilevered member extends into the cavity from a second side wall of the pair of side walls. The first and second cantilevered members are oppositely disposed offset relative to each other along the channel. The first and second end walls of the housing each having cable receiving openings for receiving the cable therethrough.

11 Claims, 3 Drawing Sheets

CABLE CINCTURE FASTENING DEVICE

CROSS REFERENCE TO RELATED APPLICATION

This application claims priority from U.S. Provisional Patent Application No. 60/234,993 filed Sep. 25, 2000 entitled Cable Cincture Fastening Device.

FIELD OF THE INVENTION

This invention relates to fastening device that allows a cable cincture to be quickly and securely fastened about a plurality of logs or like bundle, and further to be readily releasable by an operator, against the tension exerted on the cable by the bundle.

BACKGROUND OF THE INVENTION

When timber is harvested in an area which requires transportation to a processing facility, the logs are generally bundled to increase ease of handling and to increase safety. Such bundling of logs generally incorporates a cable to surround the bundle and a fastener which is generally secured to a first end of the cable and is adapted to receive and secure therein, against tension exerted on the cable by the bundled logs, an intermediate portion of the cable remote from the first end.

Such cable cinctures, used in the sense of being a girdle or belt, are in common usage in logging. However, to both the design of the cable fastening device has in the past generally proven to be unsatisfactory due to both the rough handling and abrasion of the device experienced under normal working conditions and to the likelihood of any moving parts becoming clogged with dirt and wood debris.

In the prior art the applicant is aware of U.S. Pat. No. 5,181,402 to Faessler wherein a clam-shell fastening device is secured to a loop at one end of a cable. Buttons or metal lugs secured to the cable cincture, remote from the point of attachment of the fastening device, may be selectively positioned within the clam-shell fastener. The fastening device is maintained in a closed position surrounding a button on the cable by a split pin which is slipped through small apertures which must be aligned in each portion of the clam-shell fastener.

What is neither taught nor suggested, and which are objects of the present invention to provide, are; firstly, a fastening device designed to allow attachment of the cable cincture in a manner which may minimize wear on the cable at the point of attachment; secondly, a fastening device of unitary construction which permits a metal lug secured to the cable cincture, remote from the point of attachment of the fastening device, to be rapidly and simply secured therein. The fastening device of the present invention enables simple and rapid release of the cable cincture. Further, the cable cincture fastening device of the present invention is elongate and generally aligns with the cincture to minimize interference between the fastener and the logs or other material being bundled during placement and removal of the cincture.

SUMMARY OF THE INVENTION

The cable cincture fastener of the present invention is an elongated block of aluminum alloy or similar wear resistant material, which is generally square in cross-section, preferably a rectangular parallelepiped. The fastener has an internal void, cavity or channel accessible through an elongate opening or slot formed in one elongated side of the block, and end openings, for example notches or bores, formed in longitudinal axial alignment through the ends of the block. Opposed inwardly facing flanges formed within the cavity adjacent to the slot create a sinuous or square-form sinusoidal access path to the cavity.

The fastener is attached to a first end of the cable cincture by passing an end of the cable outwardly from the cavity through a first end opening and snugging a lug or stop fixed to the opposite cable end against the internal face of the end wall. In this aspect the fastener is disposed in general axial alignment with the cable thereby allowing easy manipulation around logs or the like to be bundled when attaching or removing the cincture. The first end opening may be a bore hole if the fastener is to remain attached to the cable.

The cable of the cincture may have a plurality of lugs securely mounted to it along it's free end remote from the fastener when the fastener is mounted on the cable as above described. Securing the cincture around a bundle is accomplished by selecting a lug at a distance along the cable sufficient to snug the bundle once fastened, and placing the lug within the cavity by laying the opposite or second end of the cable into the corresponding second end opening (which is in the form of a notch), ensuring that the second end of the cable is seated within the notch so as to snug the lug against the notch opening within the cavity.

The tail of the free end of the cable, that is, the portion of the cable now extending inwardly into the cavity past the remote lug snugged against the notch opening, is inserted and woven along the sinuous access path on the block so that the tail, once straightened, is beneath the flanges and within the cavity. Installing the tail beneath the inwardly facing flanges further secures the remote lug in position against the notch opening. The extremity of the cable tail may extend from the cavity, free from the fastener.

During removal of the cincture, the ease of which forms one of the advantages of the present invention, the free end, i.e. tail, of the cable is gripped and tugged manually generally laterally of the longitudinal axis of the block to free it from confinement beneath the inwardly projecting flanges. Once freed from the flanges, the cable is then tugged generally outwardly from the cavity to thereby manually release the cincture from around the bundle without the need for tools to effect the release.

In summary, the cable fastening device of the present invention is for use in cooperation with a cable having a first lug mounted on a first end and a second lug mounted towards an opposite second end. The fastening device is for releasably fastening the first and second ends of the cable together with the cable snugly around a bundle of elongate objects such as logs. The fastening device includes a rigid housing having an elongate channel therein. The channel extends from a first end wall of the housing to a second and opposite end wall of the housing. A pair of side walls extends along the channel so as to define a channel opening and a channel cavity between the pair of side walls and the first and second end walls.

A first cantilevered member extends into the cavity from a first side wall of the pair of side walls. A second cantilevered member extends into the cavity from a second side wall of the pair of side walls. The first and second cantilevered members are oppositely disposed offset relative to each other along the channel. The first and second end walls of the housing each having cable receiving openings for receiving the cable therethrough.

In one embodiment of the present invention the first and second cantilevered members extend into the channel so as to intersect a plane which contains a longitudinal axis of symmetry of the channel cavity and which generally bisects the channel opening along its length. The first and second cantilevered members define an access path between the cantilevered members and the pair of side walls of sufficient width to pass the cable between the cantilevered members and the pair of side walls into the cavity.

The cantilevered members may advantageously be spaced from a floor of the channel so that, once the cable has been passed through the access path, the cable may straighten or be straightened along the channel adjacent the floor, that is, between the floor and the cantilevered members.

In a preferred embodiment, the first and second end walls are spaced from the first and second cantilevered members respectively so as to allow passage of one of the lugs on the cable between the first end wall and the first cantilevered member, and so as to allow passage of another of the lugs on the cable, for example at the other end of the cable, between the second end wall and the second cantilevered member respectively.

The cable receiving opening in the first end wall may be, for example, a hole through the first end wall for receiving the cable snugly journalled therethrough so as to mate the first lug of the cable against the first end wall and disposed in the cavity, or maybe for example a slot. The cable receiving opening in the second end wall may be a slot sized to snugly receive the cable therein so as to dispose the second lug in the cavity mated against the second end wall.

The cantilevered members may be flanges lying generally in a plane contained the channel opening. The cantilevered members may advantageously extend so as to overlap the cable when the cable is lying in the channel cavity.

The access path may be generally sinusoidal. The cantilevered members and the pair of sidewalls may define therebetween an access path sized for sliding weaving fitment of the cable snugly through the access path so as to dispose the cable beneath the cantilevered members and in the cavity.

The external surfaces of the end walls may be chamfered around their perimeter and the housing may be rectangular.

DETAILED DESCRIPTION OF EMBODIMENTS OF THE INVENTION

Figure 1:
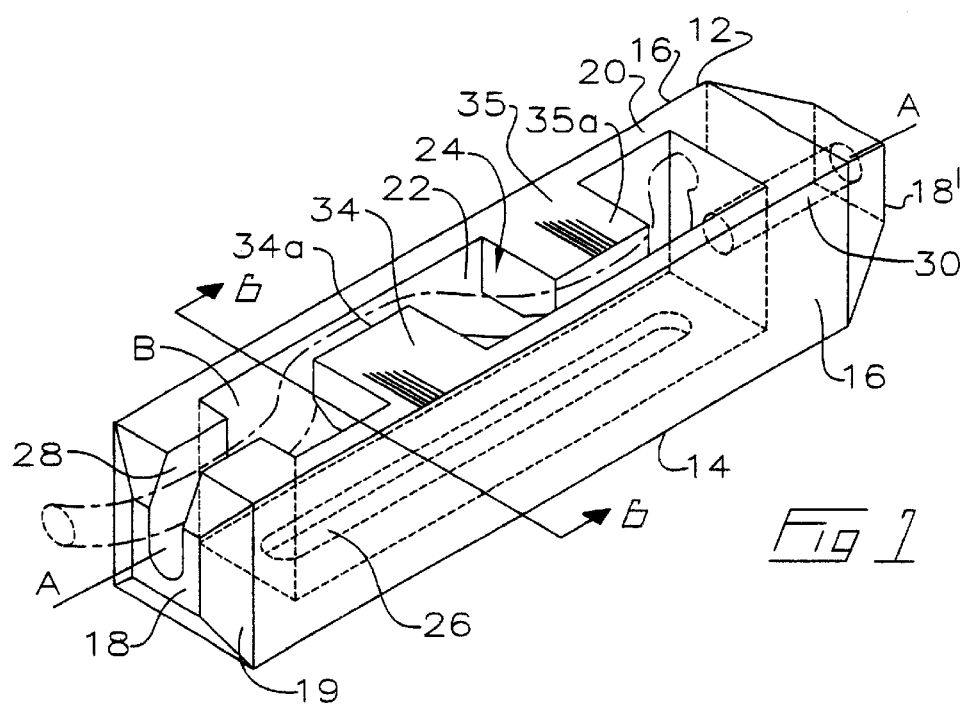
FIG. 1 is a perspective view of the cable fastener of the present invention.
Figure 2:
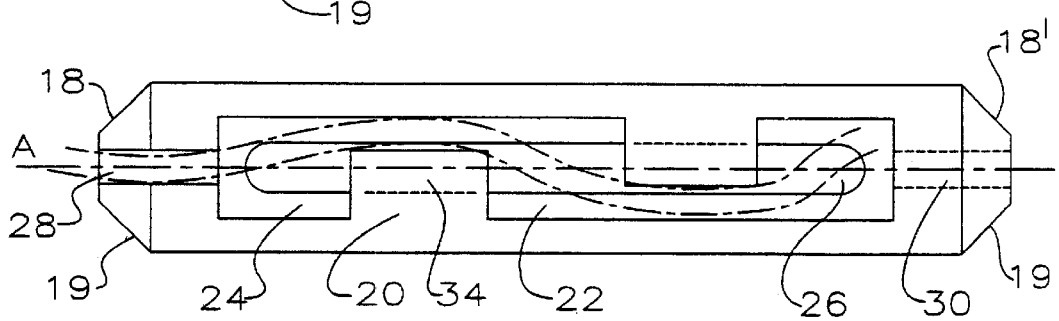
FIG. 2 is a plan view of the fastener of FIG. 1.
Figure 3:
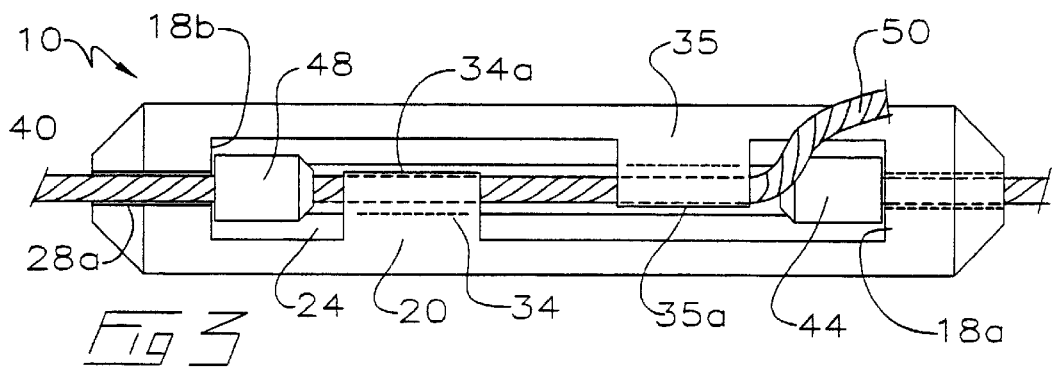
FIG. 3 is a plan view of the fastener of FIG. 1 with the cable positioned therein.
Figure 4:
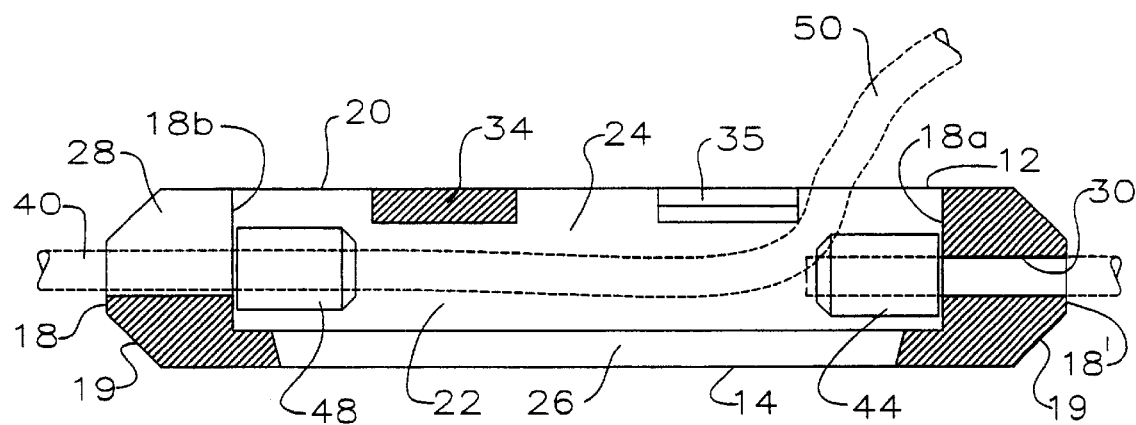
FIG. 4 is a sectional side view of the fastener of FIG. 1 with the cable mounted therein.

As seen in the accompanying figures wherein similar characters of reference depict similar parts in all views, the cable cincture fastening device 10 of the present invention is an elongated rectangular housing 12 preferably made from aluminum or similar metal alloy which may be generally square in cross-section. Housing 12 has a base 14, elongate side walls 16 defining a channel, end walls 18 and an upper surface 20 which enclose an internal cavity or void 22. Void 22 may be formed either by a machine process or by a casting technique well known in the art. Void 22 is accessible through opening 24 formed in upper surface 20, through a slot 26 formed in base 14 and through slot 28 and hole or aperture 30 formed in end walls 18 and 18' respectively. Slot 28 and aperture 30 are cable receiving openings formed in longitudinal axial alignment through the end walls 18 and 18' of housing 12. End walls 18 and 18' may have corner chamfers 19 so as to present a streamlined profile and to minimize interference between the fastener and the material being bundled, during placement and removal of the fastener.

Opening 24 formed in upper surface 20 of housing 12 is partially occluded by a pair of longitudinally spaced apart rigid cantilevered members or flanges 34 and 35 which extend laterally inwardly, from the upper edge of each elongated side wall 16 of the fastener 10 thereby creating a sinuous or square-form access path, shown as dotted line B, into the internal void 22. Flanges 34 and 35 extend laterally across void 22 but their respective ends 34a and 35a remain spaced from the opposite side wall a distance equal or greater to that of the diameter of cable 40 to which the cincture fastening device 10 is normally attached.

Figure 8:
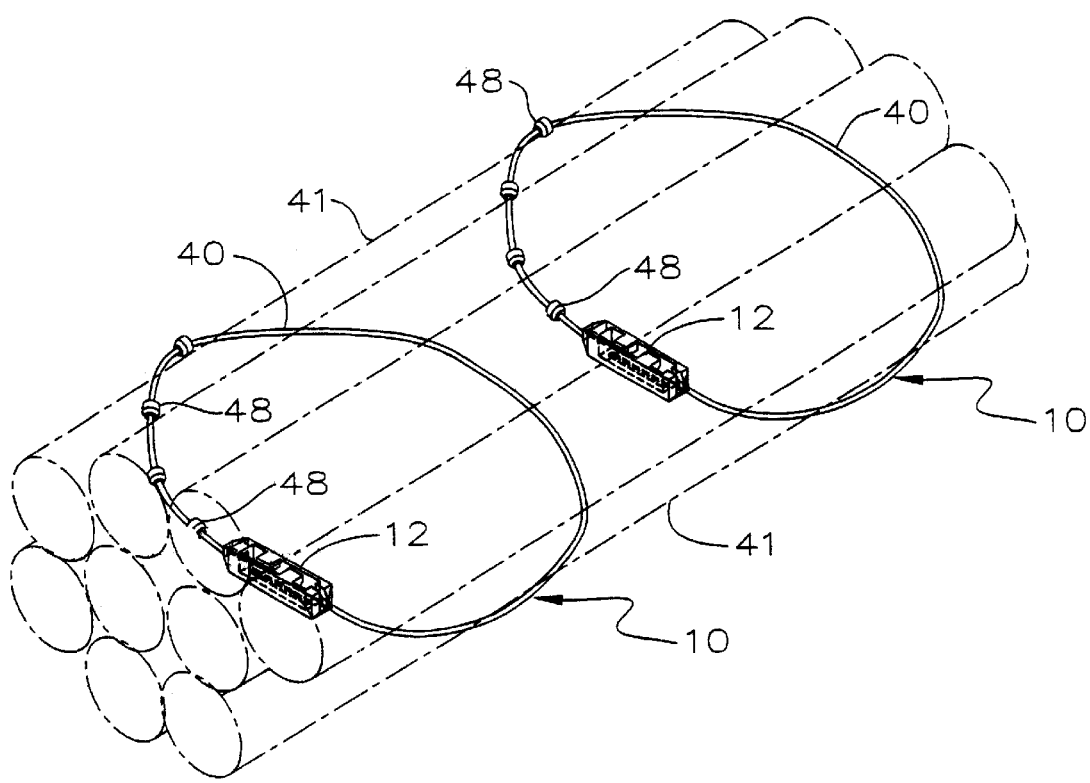
FIG. 8 is a perspective view of the fastener of the present invention in use to bundle logs.

Cable cincture 10, as is common in the forest industry, comprises cable 40 of a length suitable for the general circumference of a bundle of the material 41 being bundled (shown in dotted outline as logs in FIG. 8). A first end of cable 40 is passed through aperture 30 formed in end wall 18' of housing 12. An end lug 44 is securely mounted to the opposite second end of the cable. Once cable 40 is pulled completely through aperture 30, lug 44 is abutted against inside face 18a, so as to lay inwardly of end wall 18' adjacent aperture 30. Lug 44 is thus retained within internal void 22. One or more lugs 48 are securely mounted to and spaced apart along cable 40 at a distance remote from end lug 44. Once cable 40 is wrapped around the material being bundled, one of the remotely located lugs 48 is selected for mounting into internal void 22 so as to be locked onto end 18 of housing 12. Cable 40 is fitted within slot 28 and lug 48 positioned within internal void 22 to abut the inside face 18b of end wall 18. The tail portion 50 of cable 40 is then placed beneath spaced apart flanges 34 and 34a by sinusoidal weaving of tail 50 around the flanges along access path B so as to be retained once straightened by the natural straightening tendency of the cable in void 22 by the flanges against accidental release of the cable and lug 48 from slot 28. The flanges retain the straightened cable in part because they overlap the cable. The overlap may be defined as the ends of the flanges intersecting a plane which includes axis A and would bisect the channel opening along the length of the opening if the channel opening was not occluded by the pair of flanges. It will also be understood that the length of the spacing between adjacent lugs 48 on cable 40 will exceed the length of access path B or opening 24 so as to not interfere with the weaving of tail 50 around the flanges.

When the bundled material is to be released, tail portion 50 of cable 40 is freed from beneath the flanges 34 and 34a, for example by a reverse weaving action back along access path B, and with relatively little effort thereafter the lug 48 may be tugged free from engagement with inside face 18b of the end wall so as to extract cable 40 from slot 28 and lug 48 from within void 22.

Slot 26 formed in base 14 and the accessibility of void 22 through opening 24 formed in upper surface 20 permits easy removal of any dirt and wood debris that may become lodged within housing 12.

Figures 5, 6, 7:
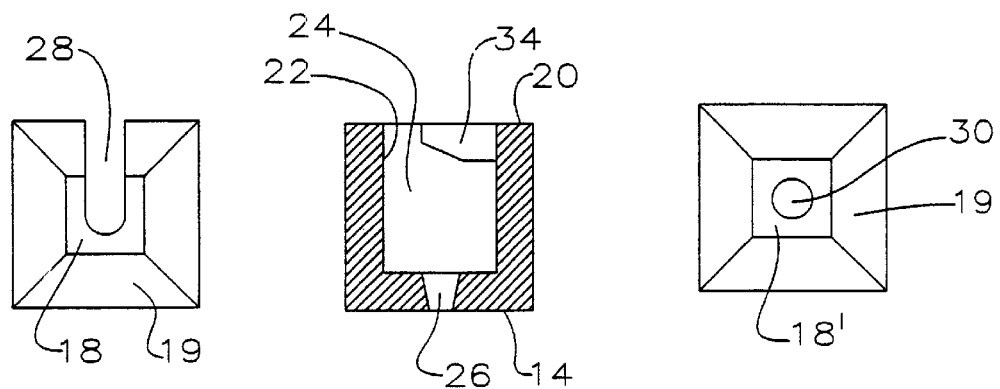
FIG. 5 is a left end view of the fastener.
FIG. 6 is a sectional view taken on line 6—6 of FIG. 1
FIG. 7 is a right end view of the fastener.

In an alternative embodiment, end 18' may have a slot similar to slot 28 rather than an aperture such as aperture 30. In such a case, when viewed end on end 18' may appear such as end 18 is depicted in FIG. 5.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. For use in cooperation with a cable having a first big mourned on a first end and a second lug mounted towards an opposite second end, a fastening device for releasably fastening the first and second ends of the cable together with the cable snugly around a bundle of elongate objects, the fastening device comprising:

a rigid housing having an elongate channel therein, said channel extending from a first end wall of said housing to a second end wail of said housing, a pair of side walls extending along said channel so as to define a channel opening and a channel cavity between said pair of side wails and said first and second end walls, a first cantilevered member extending into said cavity from a first side wall of said pair of side walls, a second cantilevered member extending into said cavity from a second side wall of said pair of side walls whereby said first and second cantilevered members are oppositely disposed, said first and second cantilevered members offset relative to each other along said channel, said first and second end walls of said housing each having cable receiving openings for receiving the cable therethrough, wherein said first and second cantilevered members extend into said channel so as to intersect a plane which contains a longitudinal axis of symmetry of said channel cavity and which generally bisects said channel opening along its length, wherein said first and second cantilevered members define an access path between said cantilevered members and said pair of side walls of sufficient width to pass the cable between said cantilevered members and said pair of side walls into said cavity.

2. The device of claim 1 wherein said cantilevered members are spaced from a floor of said channel so that, once the cable has been passed through said access path, the cable may straighten along said channel adjacent said floor, between said floor and said cantilevered members.

3. The device of claim 2 wherein said first and second end walls are spaced from said first and second cantilevered members respectively so as to allow passage of one of the lugs on the cable between said first end wall and said first cantilevered member, and so as to allow passage of another of the lugs on the cable between said second end wall and said second cantilevered member respectively.

4. The device of claim 3 wherein said cable receiving opening in said first end wall is a hole through said first end wall for receiving the cable snugly journalled therethrough so as to mate the first lug of the cable against said first end wall and disposed in said cavity.

5. The device of claim 4 wherein said cable receiving opening in said second end wall is a slot sized to snugly receive the cable therein so as to dispose the second lug in said cavity mated against said second end wall.

6. The device of claim 1 wherein said cantilevered members are flanges lying generally in a plane contained said channel opening.

7. The device of claim 1 wherein said cantilevered members extend so as to overlap the cable when the cable is lying in said channel cavity.

8. The device of claim 7 wherein said cantilevered members and said pair of sidewalls define therebetween an access path sized for sliding weaving fitment of the cable snugly through said access path so as to dispose the cable beneath said cantilevered members and in said cavity.

9. The device of claim 1 wherein said access path is generally sinusoidal.

10. The device of claim 1 wherein external surfaces of said end walls are chamfered around their perimeter.

11. The device of claim 1 wherein said housing is rectangular.

* * * * *